Patented May 2, 1944

2,348,072

UNITED STATES PATENT OFFICE 2,348,072

MANUFACTURE OF CATALYSTS

Elmer R. Kanhofer, Riverside, Ill., assignor to Universal Oil Products Company, Chicago, Ill., a corporation of Delaware No Drawing. Application March 31, 1943, Serial No. 481,277

11 Claims. (Cl. 252—254)

This invention relates to the manufacture of adsorbents and catalysts especially suitable for accelerating reactions among hydrocarbons. More specifically it has reference to a method of manufacturing finely divided adsorbents and catalytic materials which are particularly effective in selectively promoting the formation of high antiknock motor fuel from higher boiling hydrocarbons or petroleum fractions having low antiknock value. The preferred catalysts are particularly characterized by their fine texture, they consist of definite components and are prepared synthetically by definite procedures which are specific in the production of catalysts of high activity and stability under repeated regeneration.

Many manufacturing processes are generally known where hydrous oxide gels are composited in the preparation of adsorbents and catalysts useful in various treatments and reactions. The conventional gels are prepared and composited by a number of different methods in which especial care is employed in the manner in which the reagents are mixed, the concentrations used, etc. so that the hydrated silica gel and/or the other hydrous gels composited either from a precipitated gel or a sol which sets on standing to form the gel. In contradistinction thereto, it has been found that a particularly desirable form of highly active and stable adsorbents or catalysts can be produced according to the present invention by the formation of very finely divided precipitates thereby incidentally avoiding, among other things, the major difficulties which usually attend washing and filtration treatment of undried gels.

In one embodiment, the present invention comprises the manufacture of catalytic material suitable for use in hydrocarbon conversion reactions by precipitating a finely divided hydrated silica by adding an acid to a solution of an alkali metal silicate in the presence of an alkylene polyamine.

The silica thus produced may be subsequently composited with a hydrated oxide such as hydrated alumina, hydrated zirconia or both of these substances.

In a specific embodiment, said catalytic material may be prepared by coprecipitating the composite of hydrated silica and promoting hydrated oxide in finely divided form in the presence of the added alkylene polyamine.

According to the present invention, hydrous oxides of silicon are precipitated and composited with other hydrous oxides to give highly active and stable adsorbents or catalysts particularly useful in hydrocarbon conversion reactions. The hydrous silicon oxides are precipitated as very finely divided particles which tend to remain in suspension for prolonged periods of time as contrasted with the preparation of these oxides in the form of gelatinous precipitates or sols which set into gels upon prolonged standing.

This is accomplished for example by the precipitation of the hydrated silica under definitely controlled conditions in the presence of a suitable added alkylene polyamine. Various alkylene polyamines have similar although not equivalent effects when properly used so that the invention should not be construed as limited to any one compound included in this general group. The invention resides in preparing highly adsorbent and/or catalytic material by forming not a jelly or a gelatinous precipitate as is the practice in the prior art, but a very finely divided and relatively highly dispersed precipitate approaching colloidal dimensions or a composite of hydrous oxides which yields said relatively low density product of a particularly fine grained nature. The finely divided precipitate may vary in its degree of dispersion depending upon the specific operation of the process, but precipitates highly suitable for use as powdered catalysts for example, have been prepared where the particles are so small and of such a nature as to exhibit little or no tendency to settle out of suspension except on prolonged standing. It has been found in some cases that the formation of finely divided material is not only a function of the nature and amount of the added substances and the time at which they are added relative to the reactants, but is also dependent upon the dilution of the reactants and the manner in which the reactants are mixed, as will be hereinafter illustrated. Various procedures may be utilized not only in forming the finely divided hydrated oxides, but also in the manner of compositing the hydrous oxides.

In accordance with the present invention, the compounds which have been found to be effective in promoting the formation of finely divided catalytic precipitates of silica or silica-alumina composites may be broadly classified as alkylene polyamines. The simplest compound in this group is ethylene diamine which has the formula $$NH_2CH_2CH_2NH_2$$

Other compounds in this group are diethylene triamine having the formula $$NH_2CH_2CH_2NHCH_2CH_2NH_2$$

and triethylenetetra-amine having the formula $$NH_2CH_2CH_2NHCH_2CH_2NHCH_2CH_2NH_2$$

These compounds are usually made by the reaction between ethylene or other alkylene dibromides and ammonia, which type of reaction produces various alkylene polyamines which can be separated into individual compounds by fractional distillation. Since the various compounds in this group are characterized by varying solubility and varying effectiveness in promoting the formation of silica and silica-alumina type composites in finely divided condition on precipitation from solution, it is obvious that they are not to be considered as exactly equivalent. It is not known whether the compounds themselves or their acid addition products such as, for example their hydrochlorides are the dispersing or peptizing agents. When, for example, silica is precipitated by the acidification of a sodium silicate solution in the presence of one of the compounds, a certain amount of acid addition compound such as, for example ethylene diamine hydrochloride will be formed and good results have been obtained if this hydrochloride is originally present in the sodium silicate solution. If the precipitation of the silica or the silica-alumina composites is brought about by the use of other acids such as, for example sulfuric, nitric or phosphoric acids, the addition compounds will be those formed by the interaction of the alkylene polyamine and the particular acid used.

The amounts of the alkylene polyamines which are necessary for insuring the production of finely divided silica or silica-alumina type composites will also be somewhat variable. In the case of a commercial water glass solution at about a 10 to 1 dilution, ethylene diamine can be present in an amount of about 0.5% by weight of the solution without forming any precipitate. When hydrochloric acid is added slowly to such a solution, a powdered hydrated silica is precipitated. When greater concentrations of the amine are present in such diluted water glass solutions, some powder is precipitated prior to the addition of the acid. At lower concentrations of the amine a silica gel rather than a finely divided silica is formed on the addition of the acid.

Tests have been made in which a water glass of about 5 to 1 dilution and hydrochloric acid of about 1 to 1 dilution were added concurrently to a solution of ethylene diamine-hydrogen chloride which was maintained at a constant pH value by controlling the rate of acid addition. These tests showed that pH values of about 3 to 4 do not favor the complete precipitation of hydrated silica as a powder. When incompletely precipitated mixtures formed at a pH value of 3 were brought to a pH value of 6 by the slow addition of ammonium hydroxide, the hydrated silica was completely precipitated in finely divided condition. Complete precipitation of the hydrated silica in finely divided condition was also accomplished when the water glass and acid were added concurrently to the solution of the amine at pH value of 6 to 7.

Various methods may be employed in compositing the hydrous oxides of the present invention depending upon the particular use to which the product is to be put and the degree of purity desired in the final product. According to one general method, a finely divided hydrated silica may be prepared by diluting an alkali metal silicate such as a commercial grade of water glass with approximately 3 to 10 times its volume of a solution wherein an added amount of an alkylene polyamine is disposed in the proper concentration prior to the precipitation of the hydrated silica. According to this method, as a specific example, a relatively definite minimum amount of the alkylene polyamine may be used for a particular dilution and kind of water glass employed and acid gradually added while thoroughly agitating, in an amount sufficient to precipitate a finely divided hydrated silica. The rate of addition of the acid should not be rapid however. It is necessary even where the proper amount of the added substance is present to thoroughly mix the reactants in streams or by agitation and employ times of 5 to 20 minutes or more depending upon size of batch, mixing conditions, etc.

As a specific example of compositing hydrous oxides the finely divided hydrated silica prepared in this manner may be admixed, while still in suspension, with a separately precipitated hydrated oxide, or the suspension of hydrated silica may be mixed with a solution of a salt of the metal from which a hydrated oxide is to be precipitated in the presence of the finely divided hydrated silica and an alkaline precipitant added to precipitate the hydrous oxide. Variations of this procedure may be employed whereby by way of example the primary hydrated silica is filtered and separated from the salt solution, washed and purified if desired and re-slurried or otherwise composited with the remaining hydrous oxide component. According to this latter method for example, a finely divided hydrated silica may be precipitated, filtered and washed to remove alkali metal impurities by methods which will be subsequently described, and the purified hydrated silica then dispersed in the solution containing aluminum chloride, for example, and hydrated alumina precipitated in the presence of the finely divided hydrated silica by the addition of ammonium hydroxide.

After precipitating the finely divided hydrated silica as above described, unless it is to be filtered, washed and/or purified as alternatively indicated, it is composited with the remaining hydrous oxides (which may have been separately precipitated) or it is mixed with a solution of a salt of the metal of the hydrated oxide to be subsequently precipitated on its surfaces and in its pores. A basic reagent is then added whereby hydrous oxides such as precipitated alumina and/or precipitated zirconia for example are deposited. The basic reagent employed may be an alkali metal hydroxide, ammonium hydroxide or alkaline precipitants generally, and the amount added may be such that the pH is not far removed from the neutral point in the case of silica, alumina and/or zirconia composites.

According to still another procedure a solution of a soluble silicon compound may be mixed with a solution of a metal compound whose hydrous oxide is to be co-precipitated with a hydrated silicate while the added alkylene polyamine is in admixture with either or both of the solutions. The hydrogen ion concentration of the reactants or reaction mixture is adjusted according to the proportions and character of the added amine. In this case also the finely divided granular precipitate may be formed as a fine suspension distributed through the liquid when proper conditions of concentration, mixing, dilution and pH conditions are observed. Various co-precipitation procedures are possible depending upon whether silicates are used or silicon salts. The finely divided, highly dispersed suspensions produced according to the above procedures are entirely different in appearance and physical condition from gelatinous precipitates of corresponding concentrations. The gelatinous precipitates are highly hydrated and very voluminous and may sometimes constitute a relatively thick slurry when precipitated under conditions of dilution and proportion of reactants which yield fluid suspensions in the process of the present invention.

The hydrous oxides composited with the finely divided, highly dispersed hydrated silica may be those of aluminum, zirconium, vanadium, thorium, chromium, molybdenum and numerous other metals yielding composites with hydrated silica having catalytic and adsorbent properties. As a result of the procedures employed, the hydrous oxides are very intimately intermingled and/or the hydrous oxides are precipitated in the presence of specially prepared, hydrated silica and disposed in the pores and on the surfaces in the finished catalyst. Various proportions of the hydrous oxides may be employed, the more frequent practice being to employ minor amounts of added hydrous oxides and major proportions of the hydrated silicon dioxide. Thus in the preparation of highly effective silica-alumina catalysts, approximately 5 to 30 percent of hydrated alumina is preferably composited with the hydrated silicon dioxide. Smaller and higher proportions of alumina may also be utilized but generally speaking without the same catalytic effectiveness. Similarly, hydrated zirconia or other hydrous oxides may be employed or mixtures of these hydrous oxides, good results having been obtained in cracking reactions where alumina and zirconia, for example, have been composited with hydrated silicon dioxide according to this invention. Highly suitable catalysts have been produced by compositing several mols of alumina and 5 to 10 mols of zirconia with 100 mols of the specially prepared silicon dioxide.

Suspensions of the precipitates or composites are directed to any convenient form of filtration apparatus such as a filter press or centrifugal filter for example, wherein the great bulk of the liquid is removed and a filter cake formed which may be washed if desired with comparative ease as contrasted with gelatinous precipitates or gels. It has been found desirable when producing the catalyst in a highly active and stable form to carefully wash the precipitates and/or composites free from salts and particularly alkali metal impurities. This may be accomplished by various forms of washing treatment such as more or less prolonged washing with various acidic and saline solutions. Water acidulated with strong acids for example, or solutions of strong acid salts of ammonium or metals corresponding to those of the added metal oxides for example, may be suitable and the material may be purified before or after drying treatment. These purification washes may be carried out as indicated above prior to compositing of the specially prepared hydrated silica with the remaining hydrous oxides. The composite material may be finally dried at temperatures of approximately 200–250° F., more or less.

The products from the foregoing typical catalyst manufacturing reactions are very finely divided as compared with products of similar composition prepared from gels by conventional methods as illustrated by the fact that aqueous suspensions of the material in preparation are very slow in settling out. Some preparations have particular sizes of the order of .5 to 20 microns and if formed and shaped produce contact masses which are approximately one-half as dense as the corresponding formed masses produced from gels. If desired, the powder may be formed into shaped particles by the conventional consolidating and shaping processes such as pilling and briquetting or the material may be extruded. Various lubricants may be employed to facilitate pelleting such as graphite, hydrogenated vegetable oil, certain metal palmitates and stearates, etc. and organic materials such as flour, starch, etc.

The finely divided powder is highly suitable as a catalyst to be suspended in a stream of oil and processed under suitable conditions of temperature, pressure and contact time to carry out hydrocarbon conversion reactions, to produce large yields of high antiknock gasoline. In the cracking of a heavy oil where in some cases it may not be desirable to recover the catalyst, it may not be necessary to purify or even dry the powdered product. On the other hand, in many operations it will be desirable to use a highly stable form of the catalyst which is separated from residual and carbonaceous deposits and repeatedly regenerated. The powdered catalyst may then be separated from the oil by various procedures and the separated catalyst regenerated by removing hydrocarbonaceous deposits as by solvent treatment or heating in the presence of air whereupon it is used again either alone or in admixture with fresh catalyst in suspension in the hydrocarbon oil processed. The usefulness of this material however is not restricted to powdered catalyst since the material may be formed into contact masses as above described and disposed in beds in catalyst reactors and preheated vapors passed therethrough at reaction temperature. In this type of apparatus the catalyst is intermittently regenerated by heated oxidizing gas for example whereby carbonaceous deposits are removed.

The following specific example is given to illustrate a specific application of the process of the invention, and the activity of the catalyst preparation. The invention should not be considered as limited to this example of the process or to the particular catalyst preparation described since these are given as an illustration of the novelty and utility of the invention.

A catalytic material was prepared by adding concurrently 250 cc. of water glass of 5 to 1 dilution and 4N hydrochloric acid to 300 cc. of a solution containing 15 grams of ethylene diamine. During the addition of the water glass and hydrochloric acid the pH value was maintained at about 6.5. The precipitated hydrated silica was filtered and purified by washing it with acidified water having a pH value of 2 to free it of alkali metal ions.

To make a catalyst composite for use in cracking the purified finely divided silica was suspended in a solution of aluminum chloride and hydrated alumina was precipitated by the addition of ammonium hydroxide so that 5 mols of alumina were present for each 100 mols of silica. The total suspended material was then separated by filtration, washed to remove chlorides and dried to produce a finely divided silica-alumina catalyst. The catalyst thus produced can be mixed with a Pennsylvania gas oil and the mixture subjected to a temperature of 850° F. under pressure of 100 pounds per square inch to produce 60% by volume of 350° F. end point gasoline having an octane number of 78 determined by the motor method of testing.

I claim as my invention:

1. A process for the manufacture of finely divided hydrated silica which comprises adding an acid to a solution of an alkali metal silicate containing an alkylene polyamine.

2. A process for the manufacture of finely divided hydrated silica which comprises adding an acid to a solution of an alkali metal silicate containing an alkylene polyamine hydrochloride.

3. A process for the manufacture of finely divided hydrated silica which comprises adding an acid to a solution of an alkali metal silicate containing an ethylene diamine.

4. A process for the manufacture of finely divided hydrated silica which comprises adding an acid to a solution of an alkali metal silicate containing diethylene triamine.

5. A process for the manufacture of finely divided hydrated silica which comprises adding an acid to a solution of an alkali metal silicate containing triethylene tetra-amine.

6. In a process for the manufacture of a finely divided catalytic material comprising silica and suitable for use in hydrocarbon conversion reactions the step which comprises precipitating said silica from an aqueous solution of a soluble silicate containing an alkylene polyamine.

7. A process for the manufacture of a catalyst composite suitable for use in hydrocarbon conversion reactions which comprises adding an acid to a solution of an alkali metal silicate containing an alkylene polyamine to precipitate hydrated silica in finely divided condition and compositing said hydrated silica with a hydrated oxide selected from the group consisting of alumina, zirconia, and alumina and zirconia.

8. A process for the manufacture of a silica-metal oxide composite useful as a catalyst in hydrocarbon conversion reactions which comprises adding an acid to a solution of an alkali metal silicate containing an alkylene polyamine to precipitate finely divided hydrated silica, combining said hydrated silica with a solution of a metal salt, adding an alkaline reagent to precipitate a hydrated metal oxide, separating a composite of hydrated silica and hydrated metal oxide, washing said last named composite to remove soluble compounds therefrom and heating to remove water and produce said catalyst.

9. A process for the manufacture of a silica-alumina composite useful as a catalyst in hydrocarbon conversion reactions which comprises adding an acid to a solution of an alkali metal silicate containing an alkylene polyamine to precipitate finely divided hydrated silica, combining said hydrated silica with a solution of an aluminum salt, adding an alkaline reagent to precipitate a hydrated alumina, separating a composite of hydrated silica and hydrated alumina, washing said last named composite to remove soluble compounds therefrom and heating to remove water and produce said catalyst.

10. A process for the manufacture of a silica-zirconia composite useful as a catalyst in hydrocarbon conversion reactions which comprises adding an acid to a solution of an alkali metal silicate containing an alkylene polyamine to precipitate finely divided hydrated silica, combining said hydrated silica with a solution of a zirconium salt, adding an alkaline reagent to precipitate a hydrated zirconia, separating a composite of hydrated silica and hydrated zirconia, washing said last named composite to remove soluble compounds therefrom and heating to remove water and produce said catalyst.

11. A process for the manufacture of a silica-alumina-zirconia composite useful as a catalyst in hydrocarbon conversion reactions which comprises adding an acid to a solution of an alkali metal silicate containing an alkylene polyamine to precipitate finely divided hydrated silica, combining said hydrated silica with a solution containing a salt of aluminum and a salt of zirconium, adding an alkaline reagent to precipitate hydrated alumina and hydrated zirconia, separating a composite of hydrated silica, hydrated alumina and hydrated zirconia, washing said last named composite to remove soluble compounds therefrom and heating to remove water and produce said catalyst.

ELMER R. KANHOFER.